Dec. 30, 1941.   N. GERTZON   2,268,507
HEAT EXCHANGER
Filed May 4, 1940   2 Sheets-Sheet 1

INVENTOR
Nils Gertzon
BY Nathaniel Ely
ATTORNEY

Dec. 30, 1941.   N. GERTZON   2,268,507
HEAT EXCHANGER
Filed May 4, 1940   2 Sheets-Sheet 2

INVENTOR
Nils Gertzon
BY Nathaniel Ely
ATTORNEY

Patented Dec. 30, 1941

2,268,507

UNITED STATES PATENT OFFICE 2,268,507

HEAT EXCHANGER

Nils Gertzon, New York, N. Y., assignor to The Lummus Company, New York, N. Y., a corporation of Delaware Application May 4, 1940, Serial No. 333,254

2 Claims. (Cl. 257—236)

This invention relates to improvements in closures for pressure vessels and more particularly to heads or closure members for apparatus which is adapted to operate at relatively great pressure differentials.

The attachment of covers or other closure devices to high pressure chambers has involved considerable difficulty and has evoked a substantial amount of consideration. It has been recognized that the effect of relatively high pressures (400 lbs. per square inch and higher) when applied to surfaces of considerable area (18 inches in diameter and greater), causes a high gross hydrostatic load which must be assumed by the bolts in addition to the tension required to suitably compress the gasket into pressure-tight condition. With exceptional pressures and small diameters, it is almost impossible to seal the vessel for the lack of sufficient space for the necessarily large bolts.

Some remedies have been suggested but as far as I am aware, they have generally subjected the gasket directly or indirectly to the entire load and in some cases have permitted the load to assist in sealing the gasket; while in others, some of the load on the gasket has been absorbed by other than the gasket bolts. In such cases, difficulties of effective sealing exist, not only because the gasket is subjected to a great load, as well as high pressure, but also because it is impossible to detect any specific point of leakage or take any steps to correct it.

It is my conception of the difficulties that confusion has been had in attempting to solve a closure problem which involves the physical restraining of the hydrostatic loads, which is a separate problem from the sealing of the joint. The sealing operation is independent of any gross load but is dependent solely on the establishment of a pressure-tight connection and, although subjected to the effective pressure, it may not require a very strong connection if the affected area is small. On the other hand, the load applied to the closure is very great, but close fits of the securing means are not essential as the fluid pressure is independently gasketed.

It is the principal object of my invention to provide a closure member for a relatively heavy-duty high pressure vessel in which the hydrostatic load on the closure is transmitted directly to the vessel walls by interlocking shear keys and the fluid seal is established by entirely independent means which are unaffected by the limited movements of the closure member itself and which are not subjected directly or indirectly to the gross hydrostatic load, such seal being directly between the chamber portions which may thus be imperforate.

Another and more particular object of my invention is to provide an improved type of closure member for a high pressure vessel in which the closure is restrained from movement under pressure by a continuous recessed key essentially of L-shape in cross section, which transfers the hydrostatic load to the vessel wall, such key being removable only after release of the pressure and the removal of an interlocking element which may be independent or integral with the closure, such assembly and disassembly thus requiring the minimum of operations and being accomplished without difficulty even on the heavy closures of large, heavy-duty vessels.

A still further object of my invention is to provide a simplified closure device for pressure vessels which may be subjected either to vacuum or superatmospheric pressures in which the shear keys may be used alternatively for pressure or vacuum conditions so that there is a minimum of parts and a simplified structure to which the closure device may be readily assembled or disassembled.

Further objects and advantages of my invention will appear from the following description of preferred forms of embodiment thereof taken in conjunction with the attached drawings, in which Fig. 1 is an elevation, with parts in section, of a heat exchanger showing the application of my invention thereto;

Figure 1:
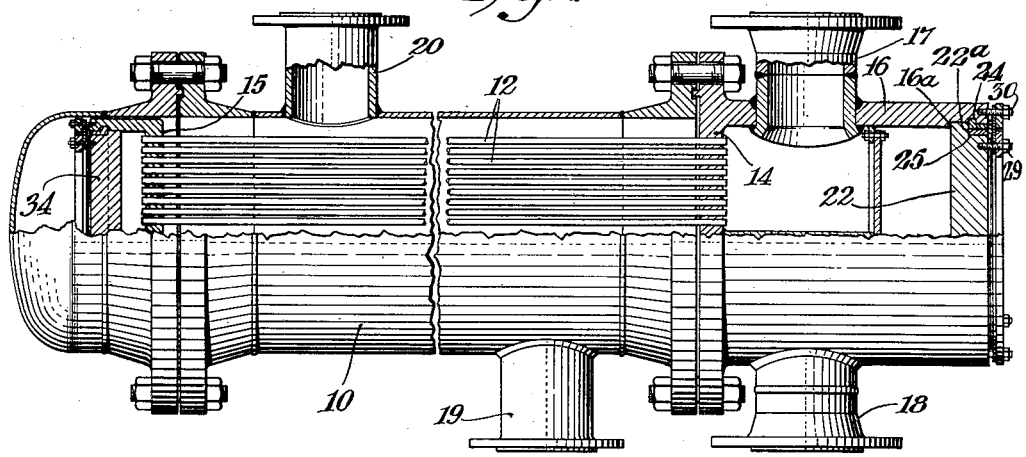

Although my invention is applicable to any form of pressure vessel, for the purpose of explanation, it will be described in connection with a heat exchanger 10 which is of a typical shell and tube type. In such a device, the tubes of the tube bundle 12 are anchored at one end to the fixed tube sheet 14 and they extend to the floating tube sheet 15 on the other end, the tube sheet being free to move with respect to the shell due to expansion and contraction. A channel 16 is provided in connection with the fixed tube sheet 14, such channel having the usual inlet and outlet nozzles 17 and 18 for the transfer of fluids through the tube bundle 12. Heat exchange is obtained by the passage of another fluid through the shell which is provided for by the inlet and outlet nozzles 19 and 20.

My invention particularly relates to the manner of closing the chambers, one of which is the channel 16, and, where the pressure within the channel is in excess of 300 or 400 lbs. per square inch and the diameter of the cover is substantial, it is desirable to provide extra reinforcing means for the cover because of the total hydrostatic load. It will be appreciated that with an internal pressure of 500 lbs. per square inch and with a diameter of channel opening of 36", there is a hydrostatic load of nearly 500,000 lbs. on the cover. The previous attempts to simultaneously resist such load and, in addition, to compress a gasket, have generally met with failure.

Figure 2:
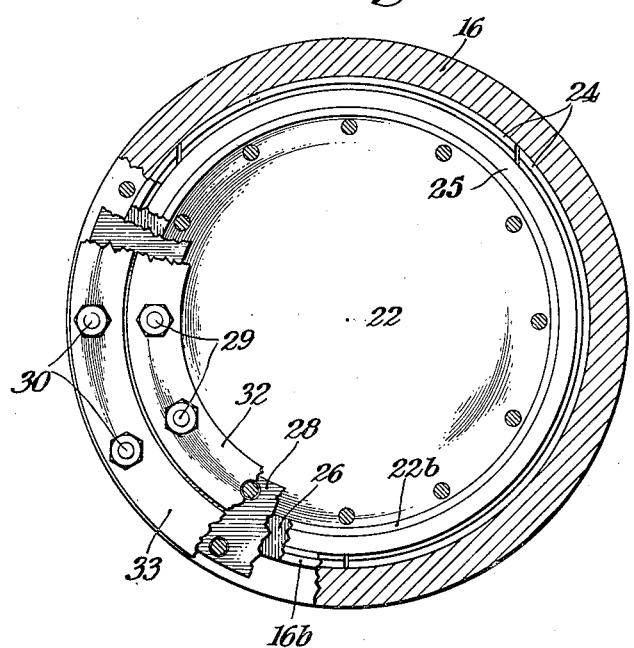
Fig. 2 is a vertical end view of the head of the exchanger with parts broken away, to show the manner of attachmen of the parts.

As shown in Figs. 1 and 2, it is the principal feature of my invention to resist all of the hydrostatic load by a shear key means which transfers the load directly to the wall of the channel. Considering the channel wall to be indicated at 16 and the channel cover indicated at 22, it will be noted that the channel cover is recessed on its outer diameter to form a shoulder 22a. The key mean 24, which is preferably a split ring and generally of L shape in cross section, is provided with a lateral portion which projects into the wall of the channel 16 and forms a shear connection therewith. The base of the key means 24 forms an abutment for the shoulder 22a on the cover and positively prevents outward movement of the cover under internal pressure. A detachable retaining ring 25, which may be of annular construction and continuous or split as desired, laterally engages the L-shaped key means 24 to hold the latter in interlocked position. The retaining ring 25 is preferably of a width such that when removed there is sufficient space so that it is possible to draw the key means 24 radially inward to release the closure from the vessel. Such construction makes it unnecessary to move the closure to a releasing position and is especially beneficial where the closure is very large and heavy. The key means 24 also has a longitudinally extended shank portion which together with retaining ring 25 fills the space between the cover 22 and wall 16. Inward movement of cover 22 is prevented by an internal shoulder 16a on the channel wall 16, said shoulder being disposed to engage the inner face of cover 22 when key means 24 and retaining ring 25 are seated in operative position on cover shoulder 22a. Any other form of channel wall abutment would be suitable, however, and my invention contemplates the provision of an abutment which may be integral or detachable as a ring to limit inward movement of the cover.

The key means 24 and retaining rings 25 are held in interlocked position in this form of the invention by the cover 22. It will be appreciated that any load, due to the resultant internal pressure on the cover 22, will maintain the cover 22 in fixed abutment against the side and bottom of ring 25 and the bottom of the key means 24 to hold both key means in position. The total load on the cover will be transferred directly to the channel wall 16. Furthermore, the channel, as well as the cover, is imperforate so that there is no place for leakage except the peripheral space around the edge of the cover. There can be no accidental loosening of the key ring and it gives a full circle contact for the transfer of loads to the channel wall.

Figure 3:
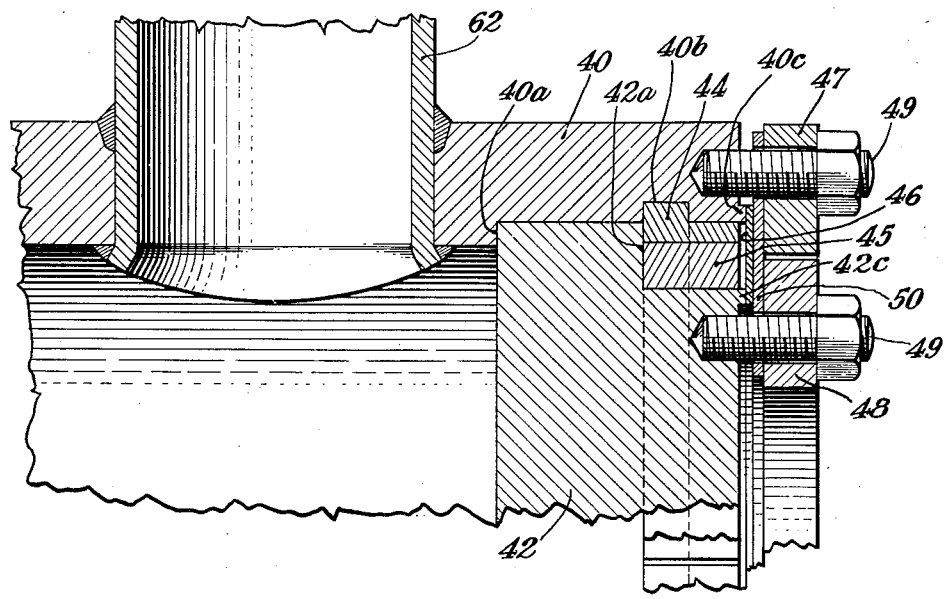
Fig. 3 is a vertical section of the same key means applied to a different form of vessel.
Figure 4:
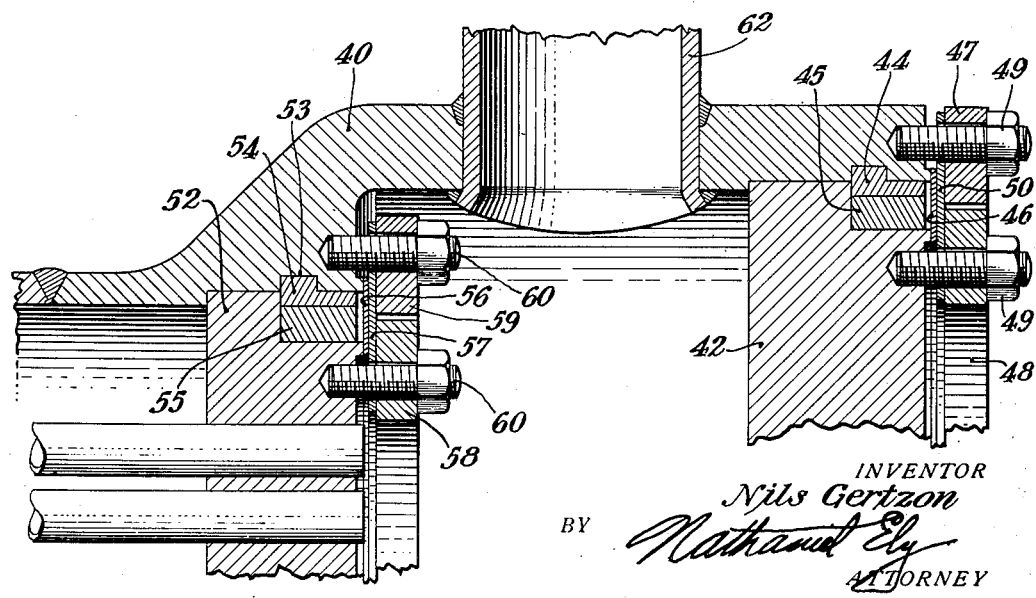
Fig. 4 is a vertical section of the channel end of a somewhat different heat exchanger showing similar key means retaining detachable closure and tube sheet members.

The seal between the cover and the shell wall is accomplished by entirely separate and independent means, which means are best illustrated in the enlarged sections of Figs. 3 and 4. Although these two figures disclose different forms of vessels, the key means and their relation to the closure are the same described in detail with respect to Figs. 1 and 2 wherein the seal means comprises a gasket 26 and a backing ring 28.

As seen in Fig. 3, the pressure vessel 40 is provided with a closure 42 which abuts against a shoulder 40a formed in the wall 40 as by increasing the internal diameter of the wall. As in the embodiment of Figs. 1 and 2, the closure 42 is held against movement in either direction, and is particularly adapted for positive positioning irrespective of changes in pressure.

The vessel wall 40 is also preferably provided with an internal recess 40b, which is similar to the recess shown in Fig. 1 and is adapted to receive the key means 44, which is preferably a split ring of L shape in cross section as in the former embodiment. The enlarged base of the key means 44 serves as an abutment for the face 42a on the closure means and, when in position as shown, will prevent outward movement of the closure 42.

As in the preceding form of the invention, the peripheral space between the closure and the channel wall in this form is sealed as by a bridged gasket 46, which engages ribs 40c on the vessel wall and 42c on the closure. The gasket may similarly be applied by a plurality of annular rings 47 and 48 drawn against the vessel wall and the closure by studs 49, and, if desired, a backing ring 50 may be used to reinforce the gasket face. It will be noticed that there is no possible place of leakage in such construction that is not fully covered by the gasket.

The use of independent pressure rings such as 47 and 48 assures a complete and independent backing for the respective nuts on the separate rows of studs 49, 49 and makes it possible to cant the backing ring 50 which directly contacts the gasket 46. This has the advantage that if a leak is discovered, it is possible to screw down on a particular nut and increase the pressure in a localized area on the gasket. It is, of course, to be understood that a single backing ring could be used, but the multiple rings 47 and 48 have additional advantages.

This form of locking device is applicable to heat exchangers or other devices which may have an internal partition member such as the tube sheet 52 shown in Fig 4. In such case, the outer vessel wall or chamber is the channel which is recessed at 53 to receive the locking ring 54 and the retaining ring 55 as in the prior construction. In a similar manner, the tube sheet 52, such as a partition or cover, may be sealed to the vessel wall 40 as by a gasket 56, which is held in position by the rings 57, 58, and 59 and the studs 60. The construction at the closure end or channel cover is the same as shown in the enlarged view in Fig. 5. The nozzle to the channel is indicated at 62.

As shown in Fig. 1, the securing device is not only applicable to the cover 22 which is the channel cover, but also to the cover 34 which is the floating tube sheet cover, as is generally described. In each case the key means is preferably a split ring of L shape in cross section, the angular longitudinal portion of which preferably projects into the wall of the channel or the tube sheet channel for the direct transfer of the load.

This invention is of particular advantage in heat exchangers, although it is adapted to any type of pressure vessel where the hydrostatic load is such that the relieving of the pressure on the securing means is justified. In a heat exchanger, where it is desirable to obtain the full exposed surface of the tubes in the tube bundle, and the openings of the channel and at the floating tube sheet are relatively large and where the pressures may be substantial, this particular form of cover is especialy valuable. It eliminates spacewasting flanges and avoids the necessity of special alloy holding bolts and permits the simple and prompt assembly of parts with an exposed gasket which can be quickly checked for any possible leaks While I have shown and described a preferred form of embodiment of my invention, I am aware that modifications may be made thereto and I, therefore, desire a broad interpretation of my invention within the scope and spirit of the description herein and of the claims appended hereinafter

I claim:

1. A pressure vessel of the class described having an opening in the wall thereof, said wall having an inwardly facing circumferential groove adjacent said opening and an inwardly extending thrust shoulder, a cover for said opening, said cover overlapping said groove and having a portion of reduced diameter extending from said circumferential groove to the outer face thereof, said cover engaging said thrust shoulder to resist inward movement of the cover, said reduced portion forming an annular channel between the wall of the cover and the wall of the vessel, a plurality of segmental L-shaped keys in said annular channel, said keys having shear portions which project into the circumferential groove in the vessel wall and integral arms extending along the vessel wall to the edge thereof, a retaining ring between the reduced diameter portion of the cover and the arm portion of the keys to resist radially inward movement of the keys out of shear position and to retain the keys in their shear relation, said retaining ring extending to the outer face of the cover and with the L-shaped keys, filling the annular recess, and detachable external gasket means sealing the joint between the cover and the vessel wall, and preventing the removal of the retaining ring.

2. In a heat exchanger of the class described, a shell having an opening in the wall thereof, said wall having an inwardly facing circumferential groove adjacent said opening and an inwardly projecting thrust shoulder, a tube sheet for said opening, said tube sheet overlapping said groove and having a portion of reduced diameter extending from said circumferential groove to the outer face thereof, said tube sheet engaging said thrust shoulder to resist inward movement of the tube sheet, said reduced portion of the tube sheet forming an annular passage between the wall of the tube sheet and the wall of the heat exchanger, a plurality of segmental L-shaped keys in said annular channel, said keys having shear portions which project into the circumferential groove in the heat exchanger wall and integral arms abutting the tube sheet and extending along the heat exchanger wall to the edge thereof to resist outward movement of the tube sheet, a retaining ring between the reduced diameter portion of the tube sheet and the arm portion of the keys to present radially inward movement of the keys out of shear position and to retain the keys in their shear relation, said retaining ring extending to the outer base of the tube sheet and with the L-shaped keys, filling the annular recess, and detachable external gasket means sealing the joint between the cover and the shell wall, and preventing the removal of the retaining ring.

NILS GERTZON.